US012786374B2

(12) United States Patent
Ding et al.

(10) Patent No.: US 12,786,374 B2
(45) Date of Patent: Nov. 3, 2026

(54) LIGHTWEIGHT VIDEO CODEC FOR MACHINE TASKS

(71) Applicant: Tencent America LLC, Palo Alto, CA (US)

(72) Inventors: Ding Ding, Washington, DC (US); Xin Zhao, San Jose, CA (US); Shan Liu, San Jose, CA (US); Roman Chernyak, Santa Clara, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 0 days.

(21) Appl. No.: 19/017,069

(22) Filed: Jan. 10, 2025

(65) Prior Publication Data

US 2025/0233977 A1 Jul. 17, 2025

Related U.S. Application Data

(60) Provisional application No. 63/638,922, filed on Apr. 25, 2024, provisional application No. 63/637,835, filed on Apr. 23, 2024, provisional application No. 63/620,709, filed on Jan. 12, 2024.

(51) Int. Cl.

| | |
|---|---|
| ***H04N 19/103*** | (2014.01) |
| ***H04N 19/136*** | (2014.01) |
| ***H04N 19/157*** | (2014.01) |
| ***H04N 19/184*** | (2014.01) |
| ***H04N 19/70*** | (2014.01) |

(52) U.S. Cl.

CPC ......... *H04N 19/103* (2014.11); *H04N 19/136* (2014.11); *H04N 19/157* (2014.11); *H04N 19/184* (2014.11); *H04N 19/70* (2014.11)

(58) Field of Classification Search

CPC .. H04N 19/103; H04N 19/136; H04N 19/157; H04N 19/184; H04N 19/70

See application file for complete search history.

(56) References Cited

U.S. PATENT DOCUMENTS 11,758,164 B2 * 9/2023 Xu ........................ H04N 19/119 375/240.25
12,439,032 B2 * 10/2025 Deng .................... H04N 19/105
12,452,463 B2 * 10/2025 Rosewarne ............ H04N 19/70
2022/0256227 A1 * 8/2022 Rezazadegan Tavakoli ................ A61B 5/4839
2023/0112309 A1 * 4/2023 Hannuksela ......... H04N 19/184 375/240.29
2024/0137570 A1 * 4/2024 Deng ...................... H04N 19/61

FOREIGN PATENT DOCUMENTS

WO WO-2025076258 A1 * 4/2025 ............. G06N 3/044

* cited by examiner

*Primary Examiner* — Dramos Kalapodas

(74) *Attorney, Agent, or Firm* — ARENTFOX SCHIFF LLP

(57) ABSTRACT

Some aspects of the disclosure provide a method of video decoding. For example, a coded video bitstream is received. The coded video bitstream includes coded information of a video for a machine task. Among coding tools of a video codec, a first subset of the coding tools is selected. The first subset of the coding tools is used for coding the video for the machine task. Decoded information is generated from the coded video bitstream based on the first subset of the coding tools. The machine task is performed using the decoded information.

20 Claims, 7 Drawing Sheets

LIGHTWEIGHT VIDEO CODEC FOR MACHINE TASKS

INCORPORATION BY REFERENCE

The present application claims the benefit of priority to U.S. Provisional Application No. 63/620,709, "LIGHTWEIGHT VIDEO CODEC FOR MACHINE TASKS" filed on Jan. 12, 2024, U.S. Provisional Application No. 63/637,835, "LIGHTWEIGHT VIDEO CODEC FOR MACHINE TASKS" filed on Apr. 23, 2024, and U.S. Provisional Application No. 63/638,922, "LIGHTWEIGHT VIDEO CODEC FOR MACHINE TASKS" filed on Apr. 25, 2024. The entire disclosures of the prior applications are hereby incorporated by reference in their entirety.

TECHNICAL FIELD

The present disclosure describes aspects generally related to video coding.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Image/video compression can help transmit image/video data across different devices, storage and networks with minimal quality degradation. In some examples, video codec technology can compress video based on spatial and temporal redundancy. In an example, a video codec can use techniques referred to as intra prediction that can compress an image based on spatial redundancy. For example, the intra prediction can use reference data from the current picture under reconstruction for sample prediction. In another example, a video codec can use techniques referred to as inter prediction that can compress an image based on temporal redundancy. For example, the inter prediction can predict samples in a current picture from a previously reconstructed picture with motion compensation. The motion compensation can be indicated by a motion vector (MV).

SUMMARY

Aspects of the disclosure include bitstreams, methods and apparatuses for video encoding/decoding. In some examples, an apparatus for video encoding/decoding includes processing circuitry.

Some aspects of the disclosure provide a method of video decoding. For example, a coded video bitstream is received. The coded video bitstream includes coded information of a video for a machine task. Among coding tools of a video codec, a first subset of the coding tools is selected. The first subset of the coding tools is used for coding the video for the machine task. Decoded information is generated from the coded video bitstream based on the first subset of the coding tools. The machine task is performed using the decoded information.

Some aspects of the disclosure provide a method of video encoding. For example, among coding tools of a video codec, a first subset of the coding tools for coding a video for a machine task is selected. Then, the video is encoded to generate coded information of the video based on the first subset of the coding tools. Further, a coded video bitstream that includes the coded information of the video for the machine task is generated.

According to an aspect of the disclosure, a method of processing visual media data is provided. In the method, a conversion between a visual media file and a bitstream of visual media data is performed according to a format rule. In an example, the bitstream includes coded information of a video for a machine task. The format rule specifies that among coding tools of a video codec, a first subset of the coding tools is selected for coding the video for the machine task; decoded information is generated from the bitstream based on the first subset of the coding tools; and the machine task is performed using the decoded information.

Aspects of the disclosure also provide an apparatus for video encoding. The apparatus for video encoding including processing circuitry configured to implement any of the described methods for video encoding.

Aspects of the disclosure also provide a method for video decoding. The method including any of the methods implemented by the apparatus for video decoding.

Aspects of the disclosure also provide a non-transitory computer-readable medium storing instructions which, when executed by a computer, cause the computer to perform any of the described methods for video decoding/encoding.

BRIEF DESCRIPTION OF THE DRAWINGS

Further features, the nature, and various advantages of the disclosed subject matter will be more apparent from the following detailed description and the accompanying drawings in which.

DETAILED DESCRIPTION

Figure 1:
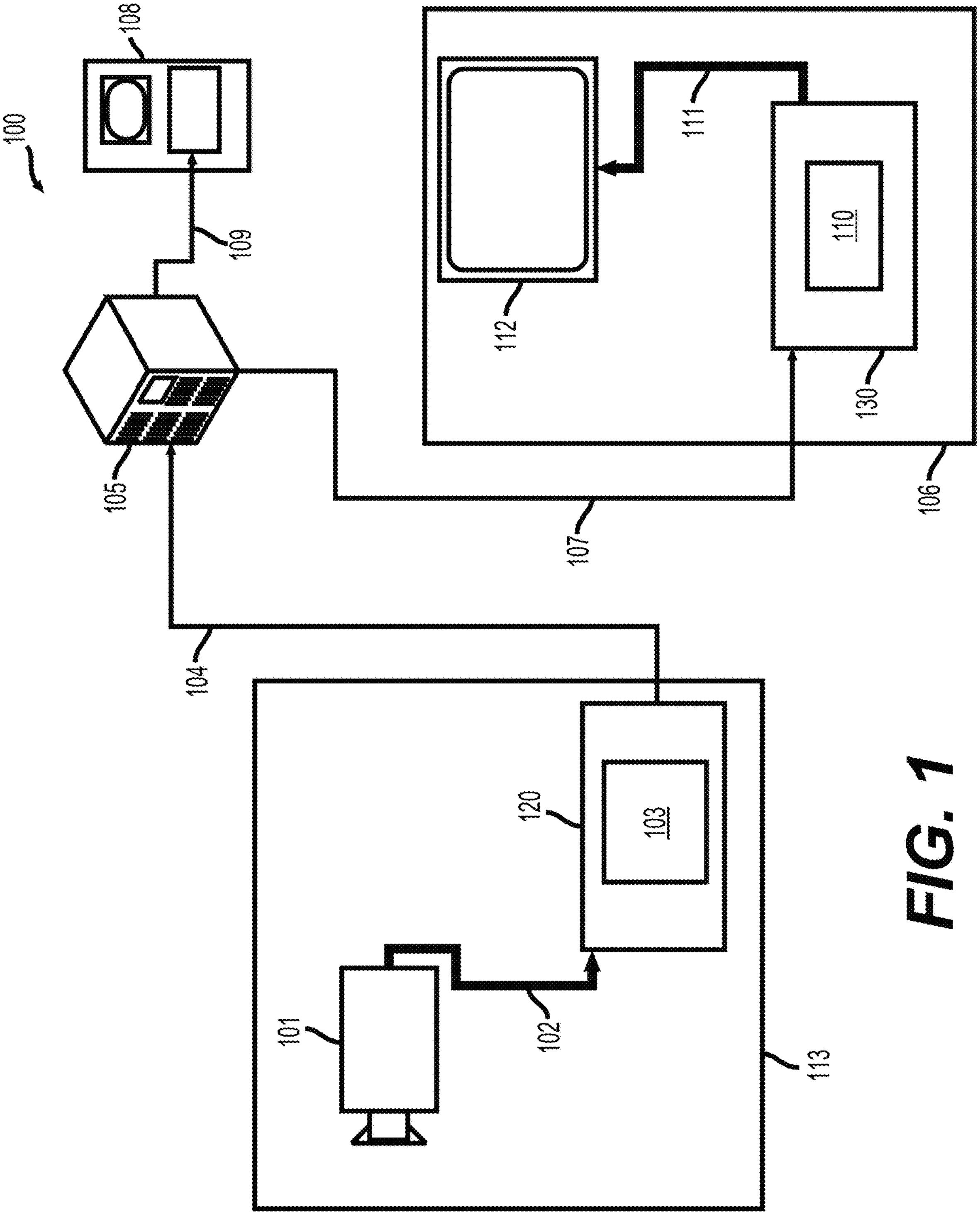
FIG. 1 is a schematic illustration of an example of a block diagram of a communication system (100).

FIG. 1 shows a block diagram of a video processing system (100) in some examples. The video processing system (100) is an example of an application for the disclosed subject matter, a video encoder and a video decoder in a streaming environment. The disclosed subject matter can be equally applicable to other video enabled applications, including, for example, video conferencing, digital TV, streaming services, storing of compressed video on digital media including CD, DVD, memory stick and the like, and so on.

The video processing system (100) includes a capture subsystem (113), that can include a video source (101), for example a digital camera, creating for example a stream of video pictures (102) that are uncompressed. In an example, the stream of video pictures (102) includes samples that are taken by the digital camera. The stream of video pictures (102), depicted as a bold line to emphasize a high data volume when compared to encoded video data (104) (or coded video bitstreams), can be processed by an electronic device (120) that includes a video encoder (103) coupled to the video source (101). The video encoder (103) can include hardware, software, or a combination thereof to enable or implement aspects of the disclosed subject matter as described in more detail below. The encoded video data (104) (or encoded video bitstream), depicted as a thin line to emphasize the lower data volume when compared to the stream of video pictures (102), can be stored on a streaming server (105) for future use. One or more streaming client subsystems, such as client subsystems (106) and (108) in FIG. 1 can access the streaming server (105) to retrieve copies (107) and (109) of the encoded video data (104). A client subsystem (106) can include a video decoder (110), for example, in an electronic device (130). The video decoder (110) decodes the incoming copy (107) of the encoded video data and creates an outgoing stream of video pictures (111) that can be rendered on a display (112) (e.g., display screen) or other rendering device (not depicted). In some streaming systems, the encoded video data (104), (107), and (109) (e.g., video bitstreams) can be encoded according to certain video coding/compression standards. Examples of those standards include ITU-T Recommendation H.265. In an example, a video coding standard under development is informally known as Versatile Video Coding (VVC). The disclosed subject matter may be used in the context of VVC.

It is noted that the electronic devices (120) and (130) can include other components (not shown). For example, the electronic device (120) can include a video decoder (not shown) and the electronic device (130) can include a video encoder (not shown) as well.

Figure 2:
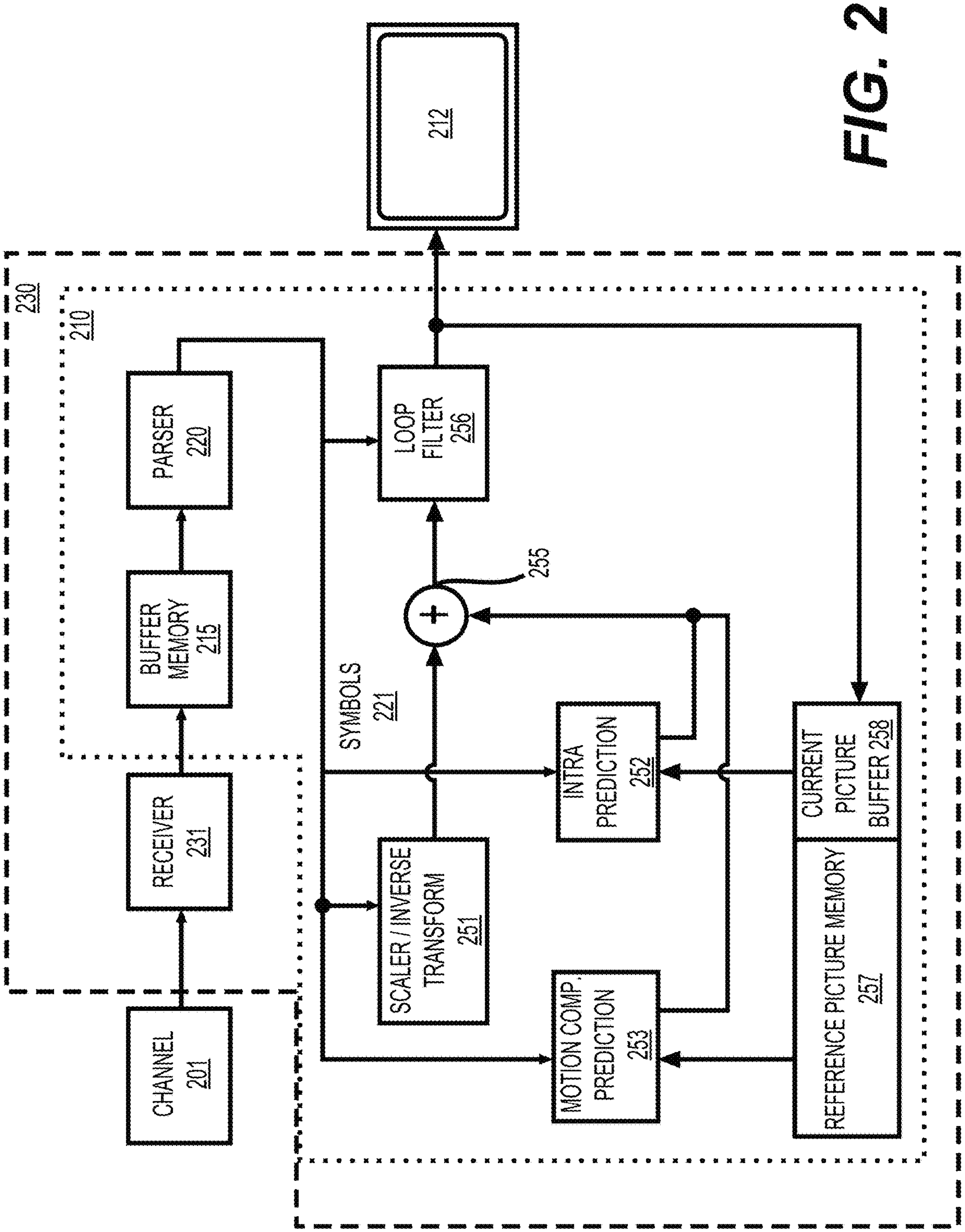
FIG. 2 is a schematic illustration of an example of a block diagram of a decoder.

FIG. 2 shows an example of a block diagram of a video decoder (210). The video decoder (210) can be included in an electronic device (230). The electronic device (230) can include a receiver (231) (e.g., receiving circuitry). The video decoder (210) can be used in the place of the video decoder (110) in the FIG. 1 example.

The receiver (231) may receive one or more coded video sequences, included in a bitstream for example, to be decoded by the video decoder (210). In an aspect, one coded video sequence is received at a time, where the decoding of each coded video sequence is independent from the decoding of other coded video sequences. The coded video sequence may be received from a channel (201), which may be a hardware/software link to a storage device which stores the encoded video data. The receiver (231) may receive the encoded video data with other data, for example, coded audio data and/or ancillary data streams, that may be forwarded to their respective using entities (not depicted). The receiver (231) may separate the coded video sequence from the other data. To combat network jitter, a buffer memory (215) may be coupled in between the receiver (231) and an entropy decoder/parser (220) ("parser (220)" henceforth). In certain applications, the buffer memory (215) is part of the video decoder (210). In others, it can be outside of the video decoder (210) (not depicted). In still others, there can be a buffer memory (not depicted) outside of the video decoder (210), for example to combat network jitter, and in addition another buffer memory (215) inside the video decoder (210), for example to handle playout timing. When the receiver (231) is receiving data from a store/forward device of sufficient bandwidth and controllability, or from an isosynchronous network, the buffer memory (215) may not be needed, or can be small. For use on best effort packet networks such as the Internet, the buffer memory (215) may be required, can be comparatively large and can be advantageously of adaptive size, and may at least partially be implemented in an operating system or similar elements (not depicted) outside of the video decoder (210).

The video decoder (210) may include the parser (220) to reconstruct symbols (221) from the coded video sequence. Categories of those symbols include information used to manage operation of the video decoder (210), and potentially information to control a rendering device such as a render device (212) (e.g., a display screen) that is not an integral part of the electronic device (230) but can be coupled to the electronic device (230), as shown in FIG. 2. The control information for the rendering device(s) may be in the form of Supplemental Enhancement Information (SEI) messages or Video Usability Information (VUI) parameter set fragments (not depicted). The parser (220) may parse/entropy-decode the coded video sequence that is received. The coding of the coded video sequence can be in accordance with a video coding technology or standard, and can follow various principles, including variable length coding, Huffman coding, arithmetic coding with or without context sensitivity, and so forth. The parser (220) may extract from the coded video sequence, a set of subgroup parameters for at least one of the subgroups of pixels in the video decoder, based upon at least one parameter corresponding to the group. Subgroups can include Groups of Pictures (GOPs), pictures, tiles, slices, macroblocks, Coding Units (CUs), blocks, Transform Units (TUs), Prediction Units (PUs) and so forth. The parser (220) may also extract from the coded video sequence information such as transform coefficients, quantizer parameter values, motion vectors, and so forth.

The parser (220) may perform an entropy decoding/parsing operation on the video sequence received from the buffer memory (215), so as to create symbols (221).

Reconstruction of the symbols (221) can involve multiple different units depending on the type of the coded video picture or parts thereof (such as: inter and intra picture, inter and intra block), and other factors. Which units are involved, and how, can be controlled by subgroup control information parsed from the coded video sequence by the parser (220). The flow of such subgroup control information between the parser (220) and the multiple units below is not depicted for clarity.

Beyond the functional blocks already mentioned, the video decoder (210) can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is appropriate.

A first unit is the scaler/inverse transform unit (251). The scaler/inverse transform unit (251) receives a quantized transform coefficient as well as control information, including which transform to use, block size, quantization factor, quantization scaling matrices, etc. as symbol(s) (221) from the parser (220). The scaler/inverse transform unit (251) can output blocks comprising sample values, that can be input into aggregator (255).

In some cases, the output samples of the scaler/inverse transform unit (251) can pertain to an intra coded block. The intra coded block is a block that is not using predictive information from previously reconstructed pictures, but can use predictive information from previously reconstructed parts of the current picture. Such predictive information can be provided by an intra picture prediction unit (252). In some cases, the intra picture prediction unit (252) generates a block of the same size and shape of the block under reconstruction, using surrounding already reconstructed information fetched from the current picture buffer (258). The current picture buffer (258) buffers, for example, partly reconstructed current picture and/or fully reconstructed current picture. The aggregator (255), in some cases, adds, on a per sample basis, the prediction information the intra prediction unit (252) has generated to the output sample information as provided by the scaler/inverse transform unit (251).

In other cases, the output samples of the scaler/inverse transform unit (251) can pertain to an inter coded, and potentially motion compensated, block. In such a case, a motion compensation prediction unit (253) can access reference picture memory (257) to fetch samples used for prediction. After motion compensating the fetched samples in accordance with the symbols (221) pertaining to the block, these samples can be added by the aggregator (255) to the output of the scaler/inverse transform unit (251) (in this case called the residual samples or residual signal) so as to generate output sample information. The addresses within the reference picture memory (257) from where the motion compensation prediction unit (253) fetches prediction samples can be controlled by motion vectors, available to the motion compensation prediction unit (253) in the form of symbols (221) that can have, for example X, Y, and reference picture components. Motion compensation also can include interpolation of sample values as fetched from the reference picture memory (257) when sub-sample exact motion vectors are in use, motion vector prediction mechanisms, and so forth.

The output samples of the aggregator (255) can be subject to various loop filtering techniques in the loop filter unit (256). Video compression technologies can include in-loop filter technologies that are controlled by parameters included in the coded video sequence (also referred to as coded video bitstream) and made available to the loop filter unit (256) as symbols (221) from the parser (220). Video compression can also be responsive to meta-information obtained during the decoding of previous (in decoding order) parts of the coded picture or coded video sequence, as well as responsive to previously reconstructed and loop-filtered sample values.

The output of the loop filter unit (256) can be a sample stream that can be output to the render device (212) as well as stored in the reference picture memory (257) for use in future inter-picture prediction.

Certain coded pictures, once fully reconstructed, can be used as reference pictures for future prediction. For example, once a coded picture corresponding to a current picture is fully reconstructed and the coded picture has been identified as a reference picture (by, for example, the parser (220)), the current picture buffer (258) can become a part of the reference picture memory (257), and a fresh current picture buffer can be reallocated before commencing the reconstruction of the following coded picture.

The video decoder (210) may perform decoding operations according to a predetermined video compression technology or a standard, such as ITU-T Rec. H.265. The coded video sequence may conform to a syntax specified by the video compression technology or standard being used, in the sense that the coded video sequence adheres to both the syntax of the video compression technology or standard and the profiles as documented in the video compression technology or standard. Specifically, a profile can select certain tools as the only tools available for use under that profile from all the tools available in the video compression technology or standard. Also necessary for compliance can be that the complexity of the coded video sequence is within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

In an aspect, the receiver (231) may receive additional (redundant) data with the encoded video. The additional data may be included as part of the coded video sequence(s). The additional data may be used by the video decoder (210) to properly decode the data and/or to more accurately reconstruct the original video data. Additional data can be in the form of, for example, temporal, spatial, or signal noise ratio (SNR) enhancement layers, redundant slices, redundant pictures, forward error correction codes, and so on.

Figure 3:
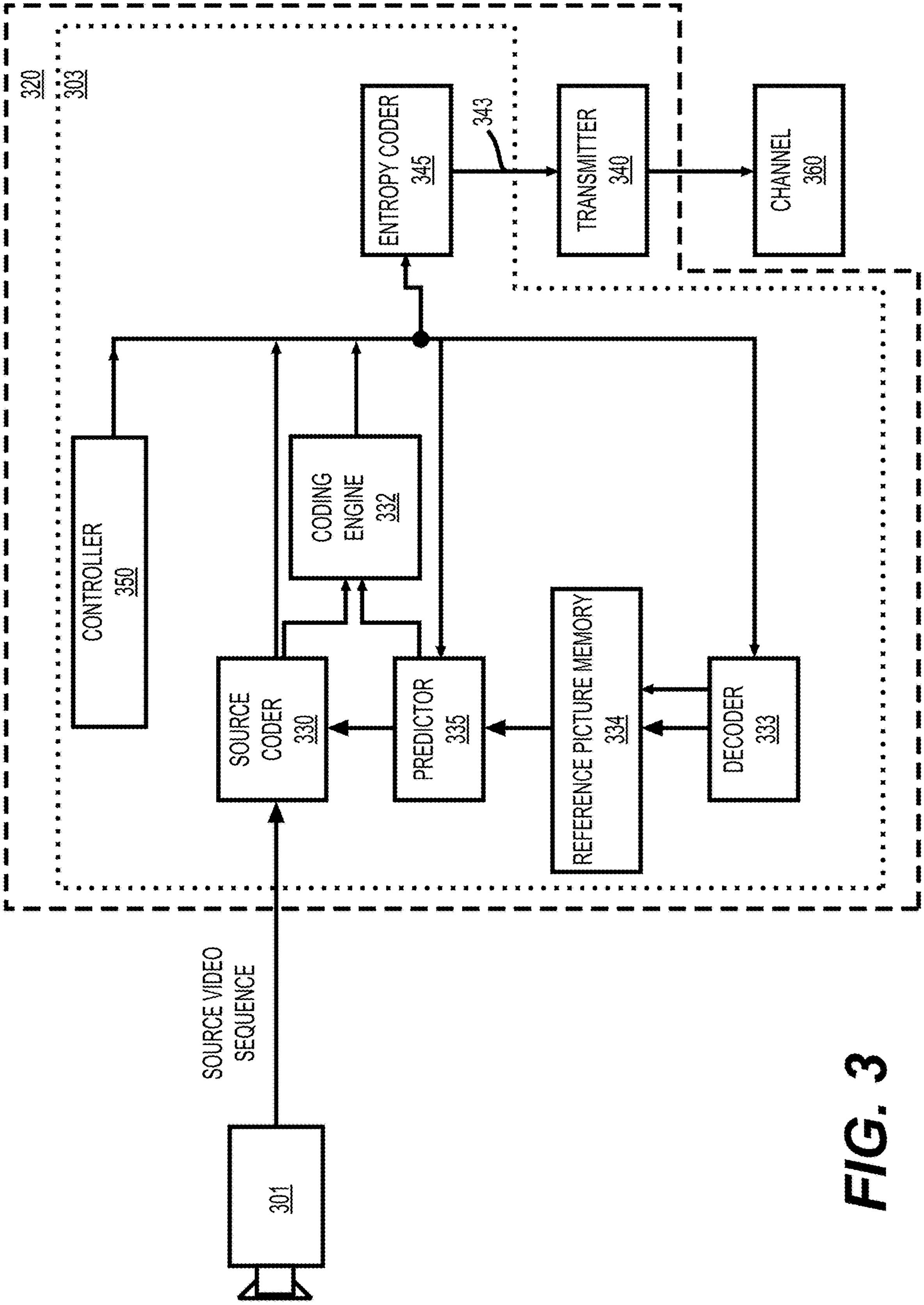
FIG. 3 is a schematic illustration of an example of a block diagram of an encoder.

FIG. 3 shows an example of a block diagram of a video encoder (303). The video encoder (303) is included in an electronic device (320). The electronic device (320) includes a transmitter (340) (e.g., transmitting circuitry). The video encoder (303) can be used in the place of the video encoder (103) in the FIG. 1 example.

The video encoder (303) may receive video samples from a video source (301) (that is not part of the electronic device (320) in the FIG. 3 example) that may capture video image(s) to be coded by the video encoder (303). In another example, the video source (301) is a part of the electronic device (320).

The video source (301) may provide the source video sequence to be coded by the video encoder (303) in the form of a digital video sample stream that can be of any suitable bit depth (for example: 8 bit, 10 bit, 12 bit, . . . ), any colorspace (for example, BT.601 Y CrCB, RGB, . . . ), and any suitable sampling structure (for example Y CrCb 4:2:0, Y CrCb 4:4:4). In a media serving system, the video source (301) may be a storage device storing previously prepared video. In a videoconferencing system, the video source (301) may be a camera that captures local image information as a video sequence. Video data may be provided as a plurality of individual pictures that impart motion when viewed in sequence. The pictures themselves may be organized as a spatial array of pixels, wherein each pixel can comprise one or more samples depending on the sampling structure, color space, etc. in use. The description below focuses on samples.

According to an aspect, the video encoder (303) may code and compress the pictures of the source video sequence into a coded video sequence (343) in real time or under any other time constraints as required. Enforcing appropriate coding speed is one function of a controller (350). In some aspects, the controller (350) controls other functional units as described below and is functionally coupled to the other functional units. The coupling is not depicted for clarity. Parameters set by the controller (350) can include rate control related parameters (picture skip, quantizer, lambda value of rate-distortion optimization techniques, . . . ), picture size, group of pictures (GOP) layout, maximum motion vector search range, and so forth. The controller (350) can be configured to have other suitable functions that pertain to the video encoder (303) optimized for a certain system design.

In some aspects, the video encoder (303) is configured to operate in a coding loop. As an oversimplified description, in an example, the coding loop can include a source coder (330) (e.g., responsible for creating symbols, such as a symbol stream, based on an input picture to be coded, and a reference picture(s)), and a (local) decoder (333) embedded in the video encoder (303). The decoder (333) reconstructs the symbols to create the sample data in a similar manner as a (remote) decoder also would create. The reconstructed sample stream (sample data) is input to the reference picture memory (334). As the decoding of a symbol stream leads to bit-exact results independent of decoder location (local or remote), the content in the reference picture memory (334) is also bit exact between the local encoder and remote encoder. In other words, the prediction part of an encoder "sees" as reference picture samples exactly the same sample values as a decoder would "see" when using prediction during decoding. This fundamental principle of reference picture synchronicity (and resulting drift, if synchronicity cannot be maintained, for example because of channel errors) is used in some related arts as well.

The operation of the "local" decoder (333) can be the same as a "remote" decoder, such as the video decoder (210), which has already been described in detail above in conjunction with FIG. 2. Briefly referring also to FIG. 2, however, as symbols are available and encoding/decoding of symbols to a coded video sequence by an entropy coder (345) and the parser (220) can be lossless, the entropy decoding parts of the video decoder (210), including the buffer memory (215), and parser (220) may not be fully implemented in the local decoder (333).

In an aspect, a decoder technology except the parsing/entropy decoding that is present in a decoder is present, in an identical or a substantially identical functional form, in a corresponding encoder. Accordingly, the disclosed subject matter focuses on decoder operation. The description of encoder technologies can be abbreviated as they are the inverse of the comprehensively described decoder technologies. In certain areas a more detail description is provided below.

During operation, in some examples, the source coder (330) may perform motion compensated predictive coding, which codes an input picture predictively with reference to one or more previously coded picture from the video sequence that were designated as "reference pictures." In this manner, the coding engine (332) codes differences between pixel blocks of an input picture and pixel blocks of reference picture(s) that may be selected as prediction reference(s) to the input picture.

The local video decoder (333) may decode coded video data of pictures that may be designated as reference pictures, based on symbols created by the source coder (330). Operations of the coding engine (332) may advantageously be lossy processes. When the coded video data may be decoded at a video decoder (not shown in FIG. 3), the reconstructed video sequence typically may be a replica of the source video sequence with some errors. The local video decoder (333) replicates decoding processes that may be performed by the video decoder on reference pictures and may cause reconstructed reference pictures to be stored in the reference picture memory (334). In this manner, the video encoder (303) may store copies of reconstructed reference pictures locally that have common content as the reconstructed reference pictures that will be obtained by a far-end video decoder (absent transmission errors).

The predictor (335) may perform prediction searches for the coding engine (332). That is, for a new picture to be coded, the predictor (335) may search the reference picture memory (334) for sample data (as candidate reference pixel blocks) or certain metadata such as reference picture motion vectors, block shapes, and so on, that may serve as an appropriate prediction reference for the new pictures. The predictor (335) may operate on a sample block-by-pixel block basis to find appropriate prediction references. In some cases, as determined by search results obtained by the predictor (335), an input picture may have prediction references drawn from multiple reference pictures stored in the reference picture memory (334).

The controller (350) may manage coding operations of the source coder (330), including, for example, setting of parameters and subgroup parameters used for encoding the video data.

Output of all aforementioned functional units may be subjected to entropy coding in the entropy coder (345). The entropy coder (345) translates the symbols as generated by the various functional units into a coded video sequence, by applying lossless compression to the symbols according to technologies such as Huffman coding, variable length coding, arithmetic coding, and so forth.

The transmitter (340) may buffer the coded video sequence(s) as created by the entropy coder (345) to prepare for transmission via a communication channel (360), which may be a hardware/software link to a storage device which would store the encoded video data. The transmitter (340) may merge coded video data from the video encoder (303) with other data to be transmitted, for example, coded audio data and/or ancillary data streams (sources not shown).

The controller (350) may manage operation of the video encoder (303). During coding, the controller (350) may assign to each coded picture a certain coded picture type, which may affect the coding techniques that may be applied to the respective picture. For example, pictures often may be assigned as one of the following picture types:

An Intra Picture (I picture) may be coded and decoded without using any other picture in the sequence as a source of prediction. Some video codecs allow for different types of intra pictures, including, for example Independent Decoder Refresh ("IDR") Pictures.

A predictive picture (P picture) may be coded and decoded using intra prediction or inter prediction using a motion vector and reference index to predict the sample values of each block.

A bi-directionally predictive picture (B Picture) may be coded and decoded using intra prediction or inter prediction using two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded predictively, via spatial prediction or via temporal prediction with reference to one previously coded reference picture. Blocks of B pictures may be coded predictively, via spatial prediction or via temporal prediction with reference to one or two previously coded reference pictures.

The video encoder (303) may perform coding operations according to a predetermined video coding technology or standard, such as ITU-T Rec. H.265. In its operation, the video encoder (303) may perform various compression operations, including predictive coding operations that exploit temporal and spatial redundancies in the input video sequence. The coded video data, therefore, may conform to a syntax specified by the video coding technology or standard being used.

In an aspect, the transmitter (340) may transmit additional data with the encoded video. The source coder (330) may include such data as part of the coded video sequence. Additional data may comprise temporal/spatial/SNR enhancement layers, other forms of redundant data such as redundant pictures and slices, SEI messages, VUI parameter set fragments, and so on.

A video may be captured as a plurality of source pictures (video pictures) in a temporal sequence. Intra-picture prediction (often abbreviated to intra prediction) makes use of spatial correlation in a given picture, and inter-picture prediction makes uses of the (temporal or other) correlation between the pictures. In an example, a specific picture under encoding/decoding, which is referred to as a current picture, is partitioned into blocks. When a block in the current picture is similar to a reference block in a previously coded and still buffered reference picture in the video, the block in the current picture can be coded by a vector that is referred to as a motion vector. The motion vector points to the reference block in the reference picture, and can have a third dimension identifying the reference picture, in case multiple reference pictures are in use.

In some aspects, a bi-prediction technique can be used in the inter-picture prediction. According to the bi-prediction technique, two reference pictures, such as a first reference picture and a second reference picture that are both prior in decoding order to the current picture in the video (but may be in the past and future, respectively, in display order) are used. A block in the current picture can be coded by a first motion vector that points to a first reference block in the first reference picture, and a second motion vector that points to a second reference block in the second reference picture. The block can be predicted by a combination of the first reference block and the second reference block.

Further, a merge mode technique can be used in the inter-picture prediction to improve coding efficiency.

According to some aspects of the disclosure, predictions, such as inter-picture predictions and intra-picture predictions, are performed in the unit of blocks. For example, according to the HEVC standard, a picture in a sequence of video pictures is partitioned into coding tree units (CTU) for compression, the CTUs in a picture have the same size, such as 64×64 pixels, 32×32 pixels, or 16×16 pixels. In general, a CTU includes three coding tree blocks (CTBs), which are one luma CTB and two chroma CTBs. Each CTU can be recursively quadtree split into one or multiple coding units (CUs). For example, a CTU of 64×64 pixels can be split into one CU of 64×64 pixels, or 4 CUs of 32×32 pixels, or 16 CUs of 16×16 pixels. In an example, each CU is analyzed to determine a prediction type for the CU, such as an inter prediction type or an intra prediction type. The CU is split into one or more prediction units (PUs) depending on the temporal and/or spatial predictability. Generally, each PU includes a luma prediction block (PB), and two chroma PBs.

In an aspect, a prediction operation in coding (encoding/decoding) is performed in the unit of a prediction block. Using a luma prediction block as an example of a prediction block, the prediction block includes a matrix of values (e.g., luma values) for pixels, such as 8×8 pixels, 16×16 pixels, 8×16 pixels, 16×8 pixels, and the like.

It is noted that the video encoders (103) and (303), and the video decoders (110) and (210) can be implemented using any suitable technique. In an aspect, the video encoders (103) and (303) and the video decoders (110) and (210) can be implemented using one or more integrated circuits. In another aspect, the video encoders (103) and (303), and the video decoders (110) and (210) can be implemented using one or more processors that execute software instructions.

According to some aspects of the disclosure, video coding can be used in machine scenarios.

Figure 4:
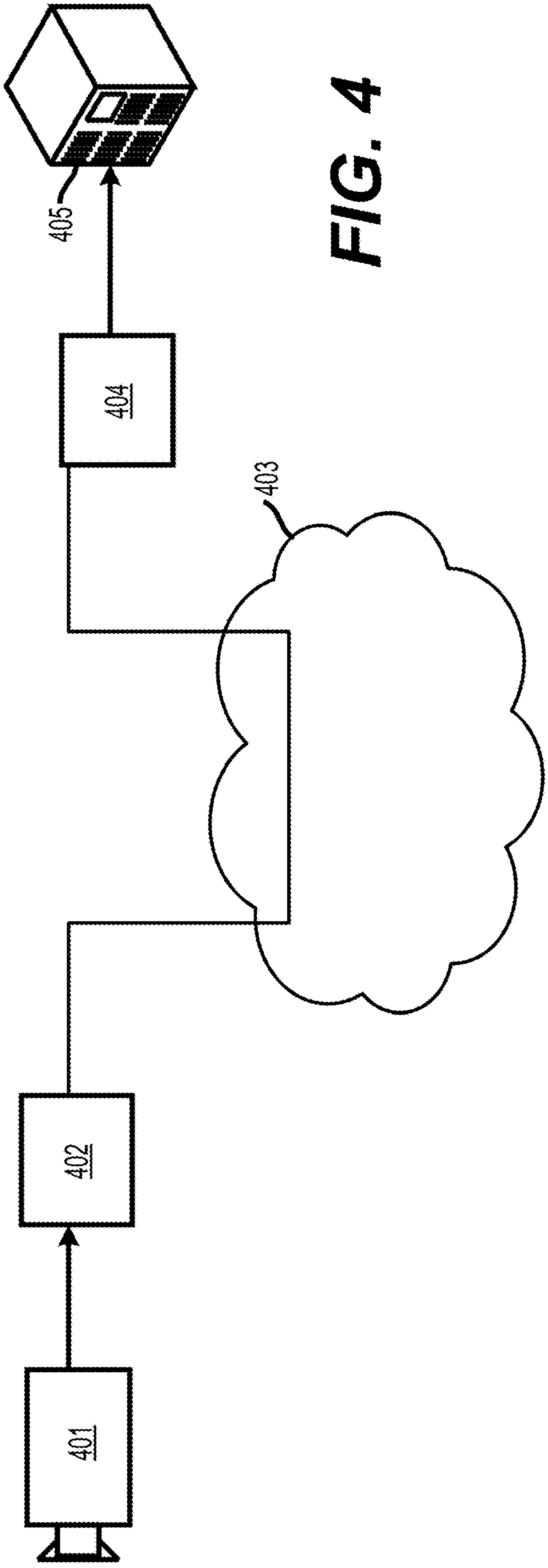
FIG. 4 shows a block diagram of a video processing system in a machine scenario in some examples.

FIG. 4 shows a block diagram of a video processing system (400) in a machine scenario in some examples. In the FIG. 4 example, the video processing system (400) includes a plurality of video sources for machine consumption. For example, the video processing system (400) includes a camera (401) coupled to an encoder device (402).

In some examples, an encoder can be optimized for machine consumption. For example, the encoder device (402) is optimized for encoding bitstreams for machine consumption. For example, the encoder device (402) is coupled, via a network (403), to a decoder device (404), and the decoder device (404) is coupled to a machine (405) that consumes the decoded video (e.g., perform further analysis, detection, and the like on the video). Thus, an encoded bitstream can be provided from the encoder device (402) to the decoder device (404) via the network (403), and the encoded bitstream can be decoded by the decoder device (404), and the decoded video data can be further processed by the machine (405).

In certain environments, such as in video coding for consumption by machines (in contrast to humans), the requirement for a bitstream to pass a quality threshold based on human perception may not be required. Instead, the quality can be sufficient for machine consumption even if not adequate for human consumption.

Video compression can be used for not only human but also machine consumptions. Video coding for machine (VCM) can be standardized to be a portion of some standards, such as ISO/IEC JTC 1 SC 29 WG 4. In some examples, VCM's reference model can use a related video codec (e.g., a related video codec for human consumption) as the core codec. However, the related video codec is primarily standardized for video application served for human vision. In some examples, several coding tools in the related video codecs are identified as not be beneficial for machine tasks, but can potentially increase complexity, such as encoding/decoding time.

Some aspects of the disclosure provide techniques for lightweight video codecs for machine tasks, such as object tracking, detection and the like. In some examples, encoder/decoder can suitably select, among coding tools of a video codec, a subset of coding tools that can be used for coding a video for a machine task. Then, the encoder/decoder can encode/decode using the selected subset of coding tools.

The techniques may be used separately or combined in any order. Further, each of the techniques (or embodiments), methods, encoders, and decoders can be implemented by processing circuitry (e.g., one or more processors or one or more integrated circuits). In one example, the one or more processors execute a program that is stored in a non-transitory computer-readable medium.

It is noted that the lightweight video codecs in the present disclosure can be used for video coding of various tasks, including but not limited to machine tasks.

According to some aspects of the disclosure, a lightweight video codec (also referred to as a light weight codec model), includes a subset of tools from a related video codec (e.g., a related video codec that is standardized for video application served for human vision). The subset of tools can be designed using the same principles as the video coding standard of the related video codec.

In some examples, the related video codec is according to video coding standards that can include, but not limited to AVS 1/2/3/4, AVC, HEVC, VVC, AV1/AV2.

In some examples, the subset of coding tools includes but is not limited to binary tree block partitions, ternary tree block partitions, recursive block partitions, secondary transform (e.g., low-frequency non-separable transform, known as LFNST), subblock motion vector refinement (e.g., decoder side motion vector refinement, known as DMVR), adaptive motion vector resolution, dependent quantization, deblocking filter and the like.

According to some aspects of the disclosure, in a lightweight video codec (also referred to as lightweight codec model), not all tools from the related video standard are included, and a subset of coding tools of the related video standard are excluded for machine tasks. In some examples, the subset of coding tools of the related video standard are tools for improving human perception and visual experience of human being, and can be excluded from machine tasks.

In some examples, the related video codec can include, but is not limited to AVS 1/2/3/4, AVC, HEVC, VVC, AV1, AV2, and the like.

In some examples, the coding tools that are excluded for machine tasks can be intra coding tools, such as (but not limited to): intra subblock prediction (ISP), matrix-based intra prediction (MIP), decoder side derived intra mode (e.g., decoder-side intra mode derivation known as DIMD), and the like.

In some examples, the coding tools that are excluded for machine tasks can be inter coding tools, such as (but not limited to): optical flow-based motion refinement (e.g., bidirectional optical flow (BDOF)), merge with motion vector difference (MMVD), subblock transform (SBT), affine based techniques, bi-prediction with CU level weights (BCW) and the like.

In some examples, the coding tools that are excluded for machine tasks can be transform and quantization tools, such as (but not limited to): multiple transform set (MTS), non-separable primary transform (NSPT), and the like.

In some examples, the coding tools that are excluded for machine tasks can be in-loop filtering tools, such as (but not limited to): luma mapping chroma scaling (LMCS), adaptive loop filter (ALF), cross-component adaptive loop filter (CCALF), sample adaptive offset (SAO), bilateral filtering, and the like.

In some aspects, the coding tools that are excluded, such as intra coding tools, the inter coding tools, the transform and quantization tools, the in-loop filtering tools that are excluded for machine tasks, are disabled by the turning off the related control flags defined in the high-level syntax. For example, when an encoder encodes video for machine tasks into a bitstream, a subset of coding tools is excluded from the encoding, and the encoder can include control flags in the bitstream. Then, when the decoder receives the bitstream, the decoder can determine the subset of coding tools to exclude from decoding.

In some examples, high-level syntax (HLS) can include, but not limited to sequence level parameter or picture level parameter.

In some examples, the control flags are not signaled in the bitstream, and the coding tools can never be applied to machine tasks. For example, when a decoder detects that a bitstream is for machine task, the decoder can determine that a subset of coding tools, such as intra coding tools, the inter coding tools, the transform and quantization tools, the in-loop filtering tools, are excluded due to the reason that the bitstream is for machine tasks, and the control flags for the subset of coding tools are not signaled in the bitstream.

In some examples, the control flags are signaled in the bitstream in usual way, but the values of the control flags are constrained. For example, the control flags associated with coding tools to exclude for a machine task are signaled in a bitstream for the machine task, the control flags associated with the coding tools to exclude for the machine task are constrained to have values indicative of the exclusion for the machine task.

In an example, the values of the control flags values are constrained without any additional conditions. For example, the following control flag are normatively constrained as following: sps_mts_enabled_flag is constrained to be equal to 0; sps_alf_enabled_flag is constrained to be equal to 0; sps_lmcs_enabled_flag is constrained to be equal to 0; sps_bdof_enabled_flag is constrained to be equal to 0; sps_mmvd_enabled_flag is constrained to be equal to 0; sps_sbt_enabled_flag is constrained to be equal to 0; sps_affine_enabled_flag is constrained to be equal to 0; sps_bcw_enabled_flag is constrained to be equal to 0; sps_isp_enabled_flag is constrained to be equal to 0; sps_mip_enabled_flag is constrained to be equal to 0.

In another embodiment the control flags values are constrained for specific scenarios including but not limited to profiles, subspofiles, tiers, levels. For example, a bitstream can includes a plurality of sequence parameter sets (SPSs), and a specific scenario can use an active SPS in the plurality of SPSs (e.g., other SPSs are inactive for the specific scenario), and the active SPS is also referred to as referenced SPS. Then, the following control flags are normatively constrained as following: the referenced SPS has sps_mts_enabled_flag constrained to be equal to 0; the referenced SPS has sps_alf_enabled_flag constrained to be equal to 0; the referenced SPS has sps_lmcs_enabled_flag constrained to be equal to 0; the referenced SPS has sps_bdof_enabled_flag constrained to be equal to 0; the referenced SPS has sps_mmvd_enabled_flag constrained to be equal to 0; the referenced SPS has sps_sbt_enabled_flag constrained to be equal to 0; the referenced SPS has sps_affine_enabled_flag constrained to be equal to 0; the referenced SPS has sps_bcw_enabled_flag constrained to be equal to 0; the referenced SPS has sps_isp_enabled_flag constrained to be equal to 0; the referenced SPS has sps_mip_enabled_flag constrained to be equal to 0.

In some examples, an additional syntax is signaled to specify whether the control flags associated with the coding tools to exclude are signaled in the bitstream or not. For example, when the additional syntax is of value 1, the control flags are signaled in the bitstream; otherwise, when the additional syntax is of value 0, the control flags are not signaled in the bitstream and can be inferred to 0.

In some examples, a first HLS flag is introduced to specify whether the bitstream is used for machine task or human vision task. Then, the signaling of the other HLS flags that control coding tool off/on depends on the first HLS flag. In an example, when the first HLS flag is signaled with a value that indicates the bitstream is used for machine task, then the signaling of the other HLS control flags for a subset of coding tools is not applied and the subset of coding tools are not applied for picture/video reconstruction using the bitstream.

In some aspects, the decision to exclude certain coding tools is based on the specific requirements of machine-oriented video coding. The configuration of enabled and disabled tools can be either a subset or a combination, depending on the specific requirements of the video coding task. In some examples, for a first machine task (e.g. object tracking), a first subset of coding tools is excluded (and not signaled), for a second machine task (e.g., object detection), a second subset of coding tools is excluded (and not signaled). The first and second subset of coding tools may have different inclusion/exclusion on at least one coding tool.

This flexibility in tool configuration allows the codec to be optimized for a variety of machine tasks, ranging from simple video processing to more complex machine learning applications.

Figure 5:
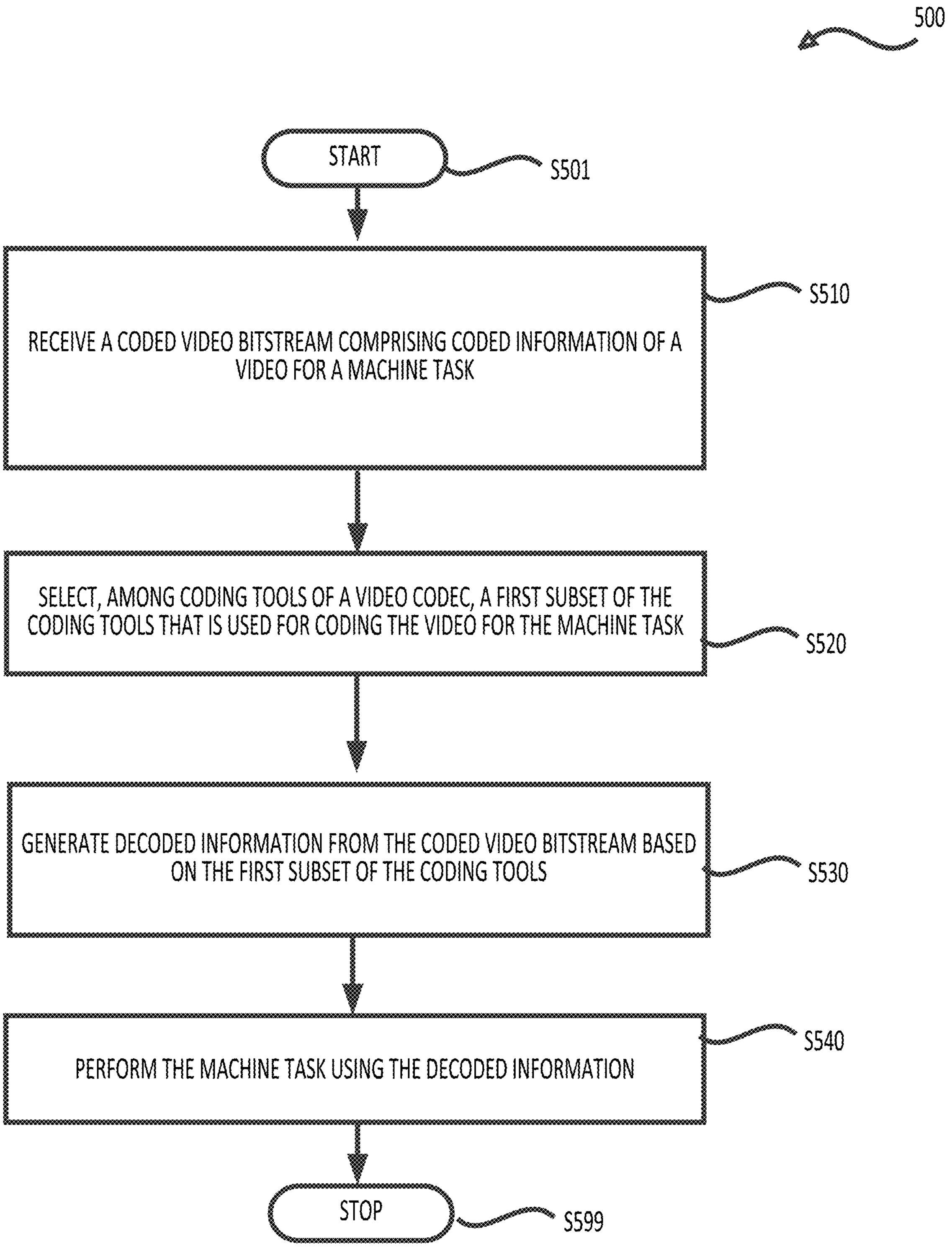
FIG. 5 shows a flow chart outlining a decoding process according to some aspects of the disclosure.

FIG. 5 shows a flow chart outlining a process (500) according to an aspect of the disclosure. The process (500) can be used in a video decoder. In various aspects, the process (500) is executed by processing circuitry, such as the processing circuitry that performs functions of the video decoder (110), the processing circuitry that performs functions of the video decoder (210), and the like. In some aspects, the process (500) is implemented in software instructions, thus when the processing circuitry executes the software instructions, the processing circuitry performs the process (500). The process starts at (S501) and proceeds to (S510).

At (S510), a coded video bitstream is received. The coded video bitstream includes coded information of a video for a machine task.

At (S520), among coding tools of a video codec, a first subset of the coding tools is selected. The first subset of the coding tools is used for coding the video for the machine task.

At (S530), decoded information is generated from the coded video bitstream based on the first subset of the coding tools.

At (S540), the machine task is performed using the decoded information.

In some aspects, the first subset of the coding tools includes at least one of: binary tree block partitions; ternary tree block partitions; recursive block partitions; secondary transform; low-frequency non-separable transform (LFNST); subblock motion vector refinement; decoder side motion vector refinement (DMVR); adaptive motion vector resolution; dependent quantization; and/or deblocking filter.

In some aspects, among the coding tools of the video codec, a second subset of the coding tools to exclude for the machine task is determined, and the decoded information is generated from the coded video bitstream without using the second subset of the coding tools.

In some examples, the second subset of the coding tools includes at least one intra coding tool, such as intra subblock prediction (ISP), matrix-based intra prediction (MIP); and/or decoder-side intra mode derivation (DIMD).

In some examples, the second subset of the coding tools includes at least one inter coding tool, such as optical flow-based motion refinement, bi-directional optical flow (BDOF), merge with motion vector difference (MMVD), subblock transform (SBT), affine mode, and/or bi-prediction with CU level weights (BCW).

In some examples, the second subset of the coding tools includes at least one transform and quantization tool, such as multiple transform set (MTS); and/or non-separable primary transform (NSPT).

In some examples, the second subset of the coding tools includes at least one in-loop filtering tool, such as luma mapping chroma scaling (LMCS), adaptive loop filter (ALF), cross-component adaptive loop filter (CCALF), sample adaptive offset (SAO), and/or bilateral filtering.

According to an aspect, the coding tools, such as the coding tools in the second subset are disabled by the turning off associated control flags defined in the high-level syntax. For example, the decoder can determine that a control flag associated with a specific coding tool indicates a disabling of the specific coding tool, and determine that the specific coding tool is in the second subset of the coding tools.

In an example, a value of the control flag is determined from a high level syntax in the coded video bitstream, the high level syntax is one of a sequence level parameter and/or a picture level parameter.

In some examples, when the coded video bitstream is determined for the machine task, a value of the control flag is determined, the value of the control flag indicates the disabling of the specific coding tool.

In some examples, the control flag is decoded from a sequence parameter set (SPS), the control flag is constrained to have a value indicating the disabling of the specific coding tool. For example, the control flag can be sps_mts_enabled_flag associated with a transform and quantization tool of multiple transform set (MTS); can be sps_alf_enabled_flag associated with an in-loop filtering tool of adaptive loop filter (ALF); can be sps_lmcs_enabled_flag associated with an in-loop filtering tool of luma mapping chroma scaling (LMCS); can be sps_bdof_enabled_flag associated with an inter coding tool of bi-directional optical flow (BDOF); can be sps_mmvd_enabled_flag associated with an inter coding tool of merge with motion vector difference (MMVD); can be sps_sbt_enabled_flag associated with an inter coding tool of subblock transform (SBT); can be sps_affine_enabled_flag associated with an inter coding tool of affine mode; can be sps_bcw_enabled_flag associated with an inter coding tool of bi-prediction with CU level weights (BCW); and can be sps_isp_enabled_flag associated with an intra coding tool of intra subblock prediction (ISP).

In some examples, the values of the control flags are constrained for specific scenarios including but not limited to profiles/subspofiles/tiers/levels. For example, a referenced sequence parameter set (SPS) associated with at least one of a profile, a subprofile, a tier and a level can be determined. The referenced SPS becomes the active SPS. The control flag can be determined from the referenced SPS, the control flag is constrained to have a value indicating the disabling of the specific coding tool. The control flag can be sps_mts_enabled_flag associated with a transform and quantization tool of multiple transform set (MTS); can be sps_alf_enabled_flag associated with an in-loop filtering tool of adaptive loop filter (ALF); can be sps_lmcs_enabled_flag associated with an in-loop filtering tool of luma mapping chroma scaling (LMCS); can be sps_bdof_enabled_flag associated with an inter coding tool of bi-directional optical flow (BDOF); can be sps_mmvd_enabled_flag associated with an inter coding tool of merge with motion vector difference (MMVD); can be sps_sbt_enabled_flag associated with an inter coding tool of subblock transform (SBT); can be sps_affine_enabled_flag associated with an inter coding tool of affine mode; can be sps_bcw_enabled_flag associated with an inter coding tool of bi-prediction with CU level weights (BCW); and/or can be sps_isp_enabled_flag associated with an intra coding tool of intra subblock prediction (ISP).

In some examples, an additional syntax is signaled to specify whether the control flags are signaled in the bit-stream or not. For example, a syntax is decoded from the coded video bitstream. When the syntax has a first value, one or more control flags are extracted from the coded video bitstream. When the syntax has a second value, one or more control flags can be inferred to have a value indicating the disabling of the specific coding tool.

In some examples, a high level syntax (HLS) flag is decoded from the coded video bitstream, the HLS flag indicates whether the coded video bitstream is for the machine task or a human vision task. When the HLS indicates that the coded video bitstream is for the machine task, among the coding tools of the video codec, the second subset of the coding tools to exclude for the machine task is determined.

In some examples, one or more requirements of the machine task can be determined. Then, the second subset of the coding tools to exclude for the machine task is determined based on the one or more requirements of the machine task.

In an example, when the machine task is object tracking, the second subset of the coding tools corresponds to a first excluding subset of the coding tools, and when the machine task is object detection, the second subset of the coding tools corresponds to a second excluding subset of the coding tools, the first excluding subset of the coding tools and the second excluding subset of the coding tools have at least one different inclusion and/or exclusion coding tool.

In some examples, the machine task can be performed based on the reconstructed pictures of the video. For example, one or more pictures of the video are reconstructed based on the first subset of the coding tools; and the machine task is performed based on the one or more pictures.

In some examples, the machine task can be performed based on intermediate information that are used to reconstruct the pictures of the video. For example, the decoded information includes intermediate information before a reconstruction of one or more pictures of the video.

Then, the process proceeds to (S599) and terminates.

The process (500) can be suitably adapted. Step(s) in the process (500) can be modified and/or omitted. Additional step(s) can be added. Any suitable order of implementation can be used.

Figure 6:
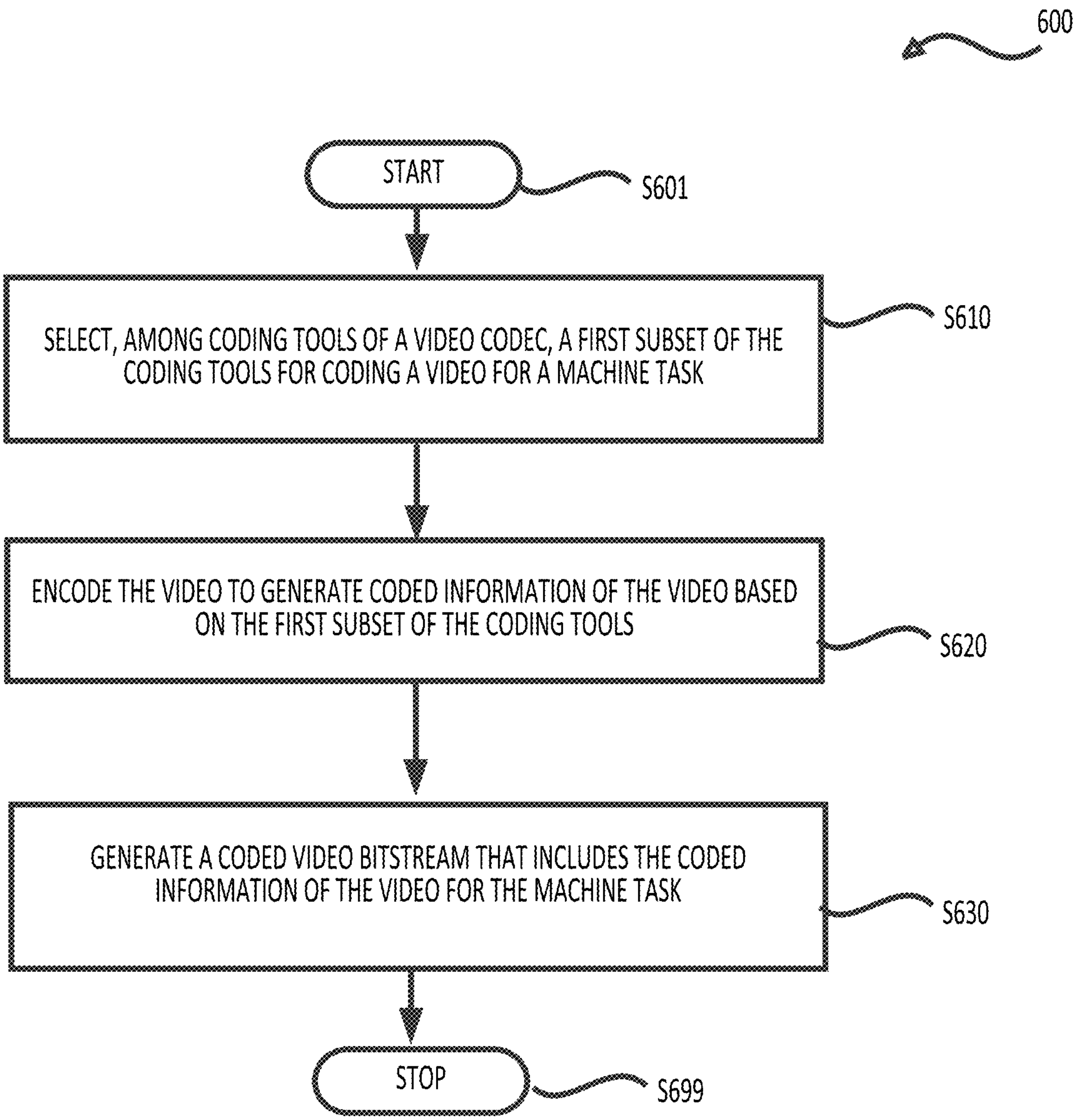
FIG. 6 shows a flow chart outlining an encoding process according to some aspects of the disclosure.

FIG. 6 shows a flow chart outlining a process (600) according to an aspect of the disclosure. The process (600) can be used in a video encoder. In various aspects, the process (600) is executed by processing circuitry, such as the processing circuitry that performs functions of the video encoder (103), the processing circuitry that performs functions of the video encoder (303), and the like. In some aspects, the process (600) is implemented in software instructions, thus when the processing circuitry executes the software instructions, the processing circuitry performs the process (600). The process starts at (S601) and proceeds to (S610).

At (S610), among coding tools of a video codec, a first subset of the coding tools for coding a video for a machine task is selected.

At (S620), the video is encoded to generate coded information of the video based on (e.g., using) the first subset of the coding tools.

At (S630), a coded video bitstream that includes the coded information of the video for the machine task is generated.

In some aspects, the first subset of the coding tools includes one or more of binary tree block partitions, ternary tree block partitions, recursive block partitions; secondary transform; low-frequency non-separable transform (LFNST); subblock motion vector refinement; decoder side motion vector refinement (DMVR); adaptive motion vector resolution; dependent quantization; and/or deblocking filter.

In some aspects, among the coding tools of the video codec, a second subset of the coding tools to exclude for the machine task is determined. The video is encoded to generate the coded information without using the second subset of the coding tools.

In some examples, the second subset of the coding tools includes one or more intra coding tools, such as intra subblock prediction (ISP), matrix-based intra prediction (MIP); and/or decoder-side intra mode derivation (DIMD).

In some examples, the second subset of the coding tools includes one or more inter coding tools, such as optical flow-based motion refinement, bi-directional optical flow (BDOF), merge with motion vector difference (MMVD), subblock transform (SBT), affine mode, and/or bi-prediction with CU level weights (BCW).

In some examples, the second subset of the coding tools includes one or more transform and quantization tools, such as multiple transform set (MTS) and/or non-separable primary transform (NSPT).

In some examples, the second subset of the coding tools includes one or more in-loop filtering tools, such as luma mapping chroma scaling (LMCS), adaptive loop filter (ALF), cross-component adaptive loop filter (CCALF), sample adaptive offset (SAO); and/or bilateral filtering.

In some aspects, a control flag is included in the coded video bitstream, the control flag is associated with a specific coding tool in the second subset and can indicate a disabling of the specific coding tool.

In some examples, the control flag is of a high level syntax in the coded video bitstream, the high level syntax is one of a sequence level parameter and/or a picture level parameter.

In some examples, the coded video bitstream is configured to indicate the machine task.

In an example, the control flag is in a sequence parameter set (SPS) in the coded video bitstream, the control flag is constrained to have a value indicating the disabling of the specific coding tool. The control flag can be sps_mts_enabled_flag associated with a transform and quantization tool of multiple transform set (MTS); can be sps_alf_enabled_flag associated with an in-loop filtering tool of adaptive loop filter (ALF); can be sps_lmcs_enabled_flag associated with an in-loop filtering tool of luma mapping chroma scaling (LMCS); can be sps_bdof_enabled_flag associated with an inter coding tool of bi-directional optical flow (BDOF); can be sps_mmvd_enabled_flag associated with an inter coding tool of merge with motion vector difference (MMVD); can be sps_sbt_enabled_flag associated with an inter coding tool of subblock transform (SBT); can be sps_affine_enabled_flag associated with an inter coding tool of affine mode; can be sps_bcw_enabled_flag associated with an inter coding tool of bi-prediction with CU level weights (BCW); and/or can be sps_isp_enabled_flag associated with an intra coding tool of intra subblock prediction (ISP).

In some examples, a referenced sequence parameter set (SPS) associated with at least one of a profile, a subprofile, a tier and a level is determined. The control flag is included into the referenced SPS, the control flag is constrained to have a value indicating the disabling of the specific coding tool. The control flag can be sps_mts_enabled_flag associated with a transform and quantization tool of multiple transform set (MTS); can be sps_alf_enabled_flag associated with an in-loop filtering tool of adaptive loop filter (ALF); can be sps_lmcs_enabled_flag associated with an in-loop filtering tool of luma mapping chroma scaling (LMCS); can be sps_bdof_enabled_flag associated with an inter coding tool of bi-directional optical flow (BDOF); can be sps_mmvd_enabled_flag associated with an inter coding tool of merge with motion vector difference (MMVD); can be sps_sbt_enabled_flag associated with an inter coding tool of subblock transform (SBT); can be sps_affine_enabled_flag associated with an inter coding tool of affine mode; can be sps_bcw_enabled_flag associated with an inter coding tool of bi-prediction with CU level weights (BCW); and/or can be sps_isp_enabled_flag associated with an intra coding tool of intra subblock prediction (ISP).

In some examples, control flags respectively associated with tools in the second subset of the coding tools are included into the coded video bitstream; and a syntax (additional syntax) is included into the coded video bitstream, the syntax has a value indicating an inclusion of the control flags in the coded video bitstream.

In an example, a high level syntax (HLS) flag is included into the coded video bitstream, the HLS flag indicates that the coded video bitstream is for the machine task.

In some examples, one or more requirements of the machine task are determined. The second subset of the coding tools to exclude for the machine task is determined based on the one or more requirements of the machine task.

In an example, when the machine task is object tracking, the second subset of the coding tools corresponds to a first excluding subset of the coding tools, and when the machine task is object detection, the second subset of the coding tools corresponds to a second excluding subset of the coding tools, the first excluding subset of the coding tools and the second excluding subset of the coding tools have at least one different inclusion and/or exclusion coding tool.

Then, the process proceeds to (S699) and terminates.

The process (600) can be suitably adapted. Step(s) in the process (600) can be modified and/or omitted. Additional step(s) can be added. Any suitable order of implementation can be used.

According to an aspect of the disclosure, a method of processing visual media data is provided. In the method, a conversion between a visual media file and a bitstream of visual media data is performed according to a format rule. For example, the bitstream may be a bitstream that is decoded/encoded in any of the decoding and/or encoding methods described herein. The format rule may specify one or more constraints of the bitstream and/or one or more processes to be performed by the decoder and/or encoder.

In an example, the bitstream includes coded information of a video for a machine task. The format rule specifies that among coding tools of a video codec, a first subset of the coding tools is selected for coding the video for the machine task; decoded information is generated from the bitstream based on the first subset of the coding tools; and the machine task is performed using the decoded information.

The techniques described above, can be implemented as computer software using computer-readable instructions and physically stored in one or more computer-readable media. For example, FIG. 7 shows a computer system (700) suitable for implementing certain aspects of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by one or more computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 7:
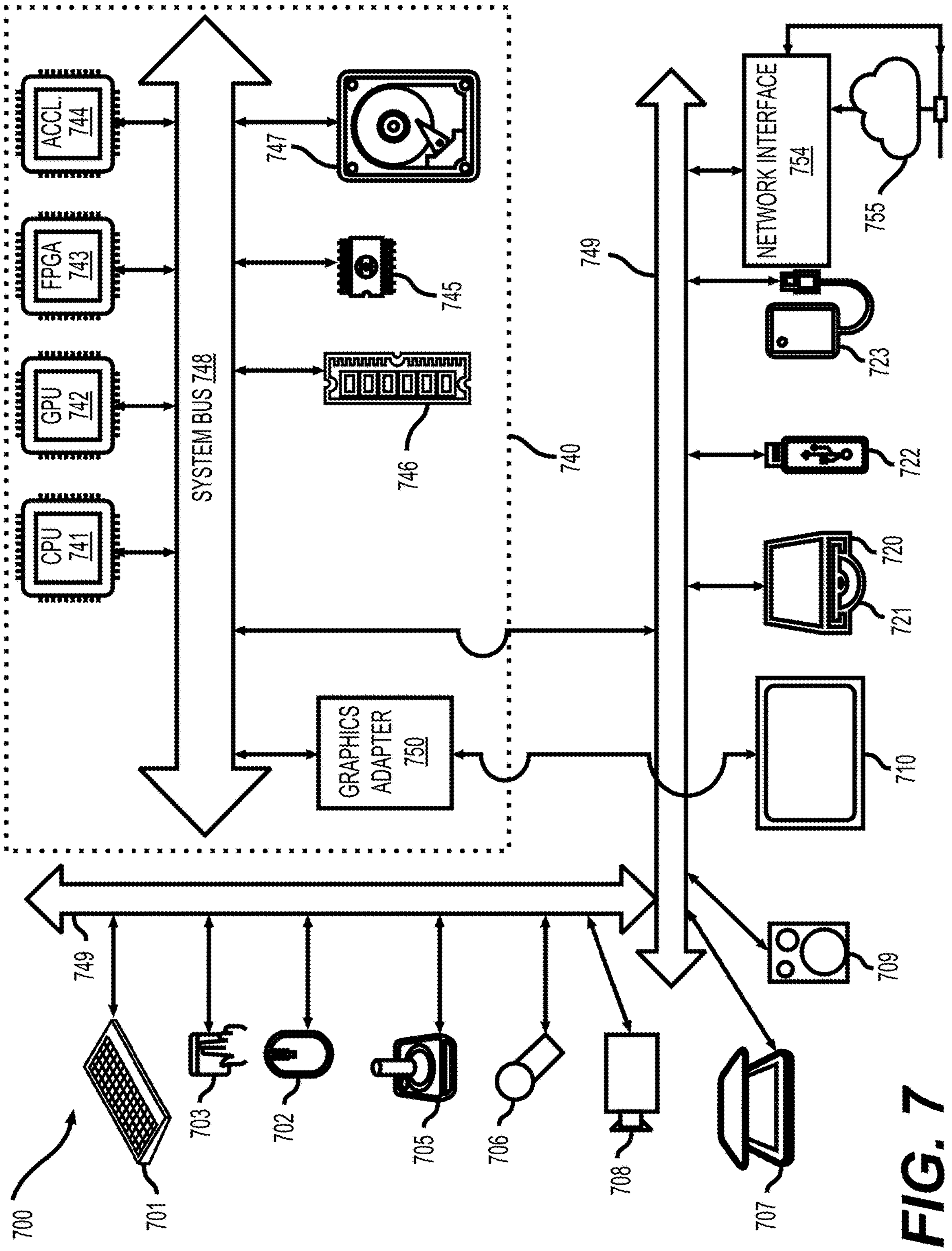
FIG. 7 is a schematic illustration of a computer system in accordance with an aspect.

The components shown in FIG. 7 for computer system (700) are examples and are not intended to suggest any limitation as to the scope of use or functionality of the computer software implementing aspects of the present disclosure. Neither should the configuration of components be interpreted as having any dependency or requirement relating to any one or combination of components illustrated in the example aspect of computer system (700).

Computer system (700) may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard (701), mouse (702), trackpad (703), touch screen (710), data-glove (not shown), joystick (705), microphone (706), scanner (707), camera (708).

Computer system (700) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (710), data-glove (not shown), or joystick (705), but there can also be tactile feedback devices that do not serve as input devices), audio output devices (such as: speakers (709), headphones (not depicted)), visual output devices (such as screens (710) to include CRT screens, LCD screens, plasma screens, OLED screens, each with or without touch-screen input capability, each with or without tactile feedback capability-some of which may be capable to output two dimensional visual output or more than three dimensional output through means such as stereographic output; virtual-reality glasses (not depicted), holographic displays and smoke tanks (not depicted)), and printers (not depicted).

Computer system (700) can also include human accessible storage devices and their associated media such as optical media including CD/DVD ROM/RW (720) with CD/DVD or the like media (721), thumb-drive (722), removable hard drive or solid state drive (723), legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system (700) can also include an interface (754) to one or more communication networks (755). Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses (749) (such as, for example USB ports of the computer system (700)); others are commonly integrated into the core of the computer system (700) by attachment to a system bus as described below (for example Ethernet interface into a PC computer system or cellular network interface into a smartphone computer system). Using any of these networks, computer system (700) can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core (740) of the computer system (700).

The core (740) can include one or more Central Processing Units (CPU) (741), Graphics Processing Units (GPU) (742), specialized programmable processing units in the form of Field Programmable Gate Areas (FPGA) (743), hardware accelerators for certain tasks (744), graphics adapters (750), and so forth. These devices, along with Read-only memory (ROM) (745), Random-access memory (746), internal mass storage such as internal non-user accessible hard drives, SSDs, and the like (747), may be connected through a system bus (748). In some computer systems, the system bus (748) can be accessible in the form of one or more physical plugs to enable extensions by additional CPUs, GPU, and the like. The peripheral devices can be attached either directly to the core's system bus (748), or through a peripheral bus (749). In an example, the screen (710) can be connected to the graphics adapter (750). Architectures for a peripheral bus include PCI, USB, and the like.

CPUs (741), GPUs (742), FPGAs (743), and accelerators (744) can execute certain instructions that, in combination, can make up the aforementioned computer code. That computer code can be stored in ROM (745) or RAM (746). Transitional data can also be stored in RAM (746), whereas permanent data can be stored for example, in the internal mass storage (747). Fast storage and retrieve to any of the memory devices can be enabled through the use of cache memory, that can be closely associated with one or more CPU (741), GPU (742), mass storage (747), ROM (745), RAM (746), and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture (700), and specifically the core (740) can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core (740) that are of non-transitory nature, such as core-internal mass storage (747) or ROM (745). The software implementing various aspects of the present disclosure can be stored in such devices and executed by core (740). A computer-readable medium can include one or more memory devices or chips, according to particular needs. The software can cause the core (740) and specifically the processors therein (including CPU, GPU, FPGA, and the like) to execute particular processes or particular parts of particular processes described herein, including defining data structures stored in RAM (746) and modifying such data structures according to the processes defined by the software. In addition or as an alternative, the computer system can provide functionality as a result of logic hardwired or otherwise embodied in a circuit (for example: accelerator (744)), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

The use of "at least one of" or "one of" in the disclosure is intended to include any one or a combination of the recited elements. For example, references to at least one of A, B, or C; at least one of A, B, and C; at least one of A, B, and/or C; and at least one of A to Care intended to include only A, only B, only C or any combination thereof. References to one of A or B and one of A and B are intended to include A or B or (A and B). The use of "one of" does not preclude any combination of the recited elements when applicable, such as when the elements are not mutually exclusive.

While this disclosure has described several examples of aspects, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

The above disclosure also encompasses the features noted below. The features may be combined in various manners and are not limited to the combinations noted below.

(1). A method of video decoding, including: receiving a coded video bitstream including coded information of a video for a machine task; selecting, among coding tools of a video codec, a first subset of the coding tools that is used for coding the video for the machine task; generating decoded information from the coded video bitstream based on the first subset of the coding tools; and performing the machine task using the decoded information.

(2). The method of feature (1), in which the first subset of the coding tools includes at least one of: binary tree block partitions; ternary tree block partitions; recursive block partitions; secondary transform; low-frequency non-separable transform (LFNST); subblock motion vector refinement; decoder side motion vector refinement (DMVR); adaptive motion vector resolution; dependent quantization; and/or deblocking filter.

(3). The method of any of features (1) to (2), in which: the selecting includes: determining, among the coding tools of the video codec, a second subset of the coding tools to exclude for the machine task; and the generating includes: generating the decoded information from the coded video bitstream without using the second subset of the coding tools.

(4). The method of any of features (1) to (3), in which the second subset of the coding tools includes at least one intra coding tool in: intra subblock prediction (ISP); matrix-based intra prediction (MIP); and/or decoder-side intra mode derivation (DIMD).

(5). The method of any of features (1) to (4), in which the second subset of the coding tools includes at least one inter coding tool in: optical flow-based motion refinement; bi-directional optical flow (BDOF); merge with motion vector difference (MMVD); subblock transform (SBT); affine mode; and/or bi-prediction with CU level weights (BCW).

(6). The method of any of features (1) to (5), in which the second subset of the coding tools includes at least one transform and quantization tool in: multiple transform set (MTS); and/or non-separable primary transform (NSPT).

(7). The method of any of features (1) to (6), in which the second subset of the coding tools includes at least one in-loop filtering tool in: luma mapping chroma scaling (LMCS); adaptive loop filter (ALF); cross-component adaptive loop filter (CCALF); sample adaptive offset (SAO); and/or bilateral filtering.

(8). The method of any of features (1) to (7), in which the determining includes: determining that a control flag associated with a specific coding tool indicates a disabling of the specific coding tool; and determining that the specific coding tool is in the second subset of the coding tools.

(9). The method of any of features (1) to (8), including: determining a value of the control flag from a high level syntax in the coded video bitstream, the high level syntax being of one of a sequence level parameter and/or a picture level parameter.

(10). The method of any of features (1) to (9), further including: determining a value of the control flag to indicate the disabling of the specific coding tool when the coded video bitstream is determined for the machine task.

(11). The method of any of features (1) to (10), further including: extracting the control flag from a sequence parameter set (SPS), the control flag being constrained to have a value indicating the disabling of the specific coding tool, in which the control flag includes at least one of: sps_mts_enabled_flag associated with a transform and quantization tool of multiple transform set (MTS); sps_alf_enabled_flag associated with an in-loop filtering tool of adaptive loop filter (ALF); sps_lmcs_enabled_flag associated with an in-loop filtering tool of luma mapping chroma scaling (LMCS); sps_bdof_enabled_flag associated with an inter coding tool of bi-directional optical flow (BDOF); sps_mmvd_enabled_flag associated with an inter coding tool of merge with motion vector difference (MMVD); sps_sbt_enabled_flag associated with an inter coding tool of subblock transform (SBT); sps_affine_enabled_flag associated with an inter coding tool of affine mode; sps_bcw_enabled_flag associated with an inter coding tool of bi-prediction with CU level weights (BCW); and/or sps_isp_enabled_flag associated with an intra coding tool of intra subblock prediction (ISP).

(12). The method of any of features (1) to (11), further including: determining a referenced sequence parameter set (SPS) associated with at least one of a profile, a subprofile, a tier and a level; and decoding the control flag from the referenced SPS, the control flag being constrained to have a value indicating the disabling of the specific coding tool, in which the control flag includes at least one of: sps_mts_enabled_flag associated with a transform and quantization tool of multiple transform set (MTS); sps_alf_enabled_flag associated with an in-loop filtering tool of adaptive loop filter (ALF); sps_lmcs_enabled_flag associated with an in-loop filtering tool of luma mapping chroma scaling (LMCS); sps_bdof_enabled_flag associated with an inter coding tool of bi-directional optical flow (BDOF); sps_mmvd_enabled_flag associated with an inter coding tool of merge with motion vector difference (MMVD); sps_sbt_enabled_flag associated with an inter coding tool of subblock transform (SBT); sps_affine_enabled_flag associated with an inter coding tool of affine mode; sps_bcw_enabled_flag associated with an inter coding tool of bi-prediction with CU level weights (BCW); and/or sps_isp_enabled_flag associated with an intra coding tool of intra subblock prediction (ISP).

(13). The method of any of features (1) to (12), further including: decoding a syntax from the coded video bitstream; when the syntax has a first value, decoding the control flag from the coded video bitstream; and when the syntax has a second value, inferring the control flag to have a value indicating the disabling of the specific coding tool.

(14). The method of any of features (1) to (13), in which the determining includes: decoding a high level syntax (HLS) flag from the coded video bitstream, the HLS flag indicating whether the coded video bitstream is for the machine task or a human vision task; and when the HLS indicates that the coded video bitstream is for the machine task, determining, among the coding tools of the video codec, the second subset of the coding tools to exclude for the machine task.

(15). The method of any of features (1) to (14), in which the determining includes: determining one or more requirements of the machine task; and determining the second subset of the coding tools to exclude for the machine task based on the one or more requirements of the machine task.

(16). The method of any of features (1) to (15), in which when the machine task is object tracking, the second subset of the coding tools corresponds to a first excluding subset of the coding tools, and when the machine task is object detection, the second subset of the coding tools corresponds to a second excluding subset of the coding tools, the first excluding subset of the coding tools and the second excluding subset of the coding tools have at least one different inclusion and/or exclusion coding tool.

(17). The method of any of features (1) to (16), in which: the generating includes: reconstructing one or more pictures of the video based on the first subset of the coding tools; and the performing includes: performing the machine task based on the one or more pictures.

(18). The method of any of features (1) to (17), in which the decoded information includes intermediate information before a reconstruction of one or more pictures of the video.

(19). A method of video encoding, including: selecting, among coding tools of a video codec, a first subset of the coding tools for coding a video for a machine task; encoding the video to generate coded information of the video based on (e.g., using) the first subset of the coding tools; and generating a coded video bitstream that includes the coded information of the video for the machine task.

(20). The method of feature (19), in which the first subset of the coding tools includes at least one of: binary tree block partitions; ternary tree block partitions; recursive block partitions; secondary transform; low-frequency non-separable transform (LFNST); subblock motion vector refinement; decoder side motion vector refinement (DMVR); adaptive motion vector resolution; dependent quantization; and/or deblocking filter.

(21). The method of any of features (19) to (20), in which: the selecting includes: determining, among the coding tools of the video codec, a second subset of the coding tools to exclude for the machine task; and the encoding includes: encoding the video to generate the coded information without using the second subset of the coding tools.

(22). The method of any of features (19) to (21), in which the second subset of the coding tools includes at least one intra coding tool in: intra subblock prediction (ISP); matrix-based intra prediction (MIP); and/or decoder-side intra mode derivation (DIMD).

(23). The method of any of features (19) to (22), in which the second subset of the coding tools includes at least one inter coding tool in: optical flow-based motion refinement; bi-directional optical flow (BDOF); merge with motion vector difference (MMVD); subblock transform (SBT); affine mode; and/or bi-prediction with CU level weights (BCW).

(24). The method of any of features (19) to (23), in which the second subset of the coding tools includes at least one transform and quantization tool in: multiple transform set (MTS); and/or non-separable primary transform (NSPT).

(25). The method of any of features (19) to (24), in which the second subset of the coding tools includes at least one in-loop filtering tool in: luma mapping chroma scaling (LMCS); adaptive loop filter (ALF); cross-component adaptive loop filter (CCALF); sample adaptive offset (SAO); and/or bilateral filtering.

(26). The method of any of features (19) to (25), in which the generating includes: including a control flag in the coded video bitstream, the control flag being associated with a specific coding tool in the second subset and indicating a disabling of the specific coding tool.

(27). The method of any of features (19) to (26), in which the control flag is of a high level syntax in the coded video bitstream, the high level syntax is one of a sequence level parameter and/or a picture level parameter.

(28). The method of any of features (19) to (27), in which the coded video bitstream is configured to indicate the machine task.

(29). The method of any of features (19) to (28), further including: including the control flag in a sequence parameter set (SPS) in the coded video bitstream, the control flag being constrained to have a value indicating the disabling of the specific coding tool, in which the control flag includes at least one of: sps_mts_enabled_flag associated with a transform and quantization tool of multiple transform set (MTS); sps_alf_enabled_flag associated with an in-loop filtering tool of adaptive loop filter (ALF); sps_Imcs_enabled_flag associated with an in-loop filtering tool of luma mapping chroma scaling (LMCS); sps_bdof_enabled_flag associated with an inter coding tool of bi-directional optical flow (BDOF); sps_mmvd_enabled_flag associated with an inter coding tool of merge with motion vector difference (MMVD); sps_sbt_enabled_flag associated with an inter coding tool of subblock transform (SBT); sps_affine_enabled_flag associated with an inter coding tool of affine mode; sps_bcw_enabled_flag associated with an inter coding tool of bi-prediction with CU level weights (BCW); and/or sps_isp_enabled_flag associated with an intra coding tool of intra subblock prediction (ISP).

(30). The method of any of features (19) to (29), further including: determining a referenced sequence parameter set (SPS) associated with at least one of a profile, a subprofile, a tier and a level; and including the control flag into the referenced SPS, the control flag being constrained to have a value indicating the disabling of the specific coding tool, in which the control flag includes at least one of: sps_mts_enabled_flag associated with a transform and quantization tool of multiple transform set (MTS); sps_alf_enabled_flag associated with an in-loop filtering tool of adaptive loop filter (ALF); sps_Imcs_enabled_flag associated with an in-loop filtering tool of luma mapping chroma scaling (LMCS); sps_bdof_enabled_flag associated with an inter coding tool of bi-directional optical flow (BDOF); sps_mmvd_enabled_flag associated with an inter coding tool of merge with motion vector difference (MMVD); sps_sbt_enabled_flag associated with an inter coding tool of subblock transform (SBT); sps_affine_enabled_flag associated with an inter coding tool of affine mode; sps_bcw_enabled_flag associated with an inter coding tool of bi-prediction with CU level weights (BCW); and/or sps_isp_enabled_flag associated with an intra coding tool of intra subblock prediction (ISP).

(31). The method of any of features (19) to (30), further including: including control flags respectively associated with tool in the second subset of the coding tools into the coded video bitstream; and including a syntax into the coded video bitstream, the syntax having a value indicating an inclusion of the control flags in the coded video bitstream.

(32). The method of any of features (19) to (31), further including: including a high level syntax (HLS) flag into the coded video bitstream, the HLS flag indicating that the coded video bitstream is for the machine task.

(33). The method of any of features (19) to (32), further including: determining one or more requirements of the machine task; and determining the second subset of the coding tools to exclude for the machine task based on the one or more requirements of the machine task.

(34). The method of any of features (19) to (33), in which when the machine task is object tracking, the second subset of the coding tools corresponds to a first excluding subset of the coding tools, and when the machine task is object detection, the second subset of the coding tools corresponds to a second excluding subset of the coding tools, the first excluding subset of the coding tools and the second excluding subset of the coding tools have at least one different inclusion and/or exclusion coding tool.

(35). A method of video processing, the method including: processing a bitstream of video data according to a format rule, in which: the bitstream includes coded information of a video for a machine task; and the format rule specifies that: among coding tools of a video codec, a first subset of the coding tools is selected for coding the video for the machine task; decoded information is generated from the bitstream based on the first subset of the coding tools; and the machine task is performed using the decoded information.

(36). An apparatus for video decoding, including processing circuitry that is configured to perform the method of any of features (1) to (18).

(37). An apparatus for video encoding, including processing circuitry that is configured to perform the method of any of features (19) to (34).

(38). A non-transitory computer-readable storage medium storing instructions which when executed by at least one processor cause the at least one processor to perform the method of any of features (1) to (35).

What is claimed is:

1. A method of video decoding, comprising:

receiving a coded video bitstream comprising coded information of a video for a machine task;

selecting, among a plurality of coding tools of a video codec, a first subset of the plurality of coding tools that is used for coding the video for the machine task, remaining coding tools of the plurality of coding tools other than the first subset being excluded from decoding of the coded information of the video, the remaining coding tools comprising one or more coding tools that increase a visual quality of a reconstructed image for human perception;

generating decoded information from the decoding of the coded information of the video based on the first subset of the plurality of coding tools; and performing the machine task using the decoded information.

2. The method of claim 1, wherein the first subset of the plurality of coding tools comprises at least one of:

binary tree block partitions;

ternary tree block partitions;

recursive block partitions;

secondary transform;

low-frequency non-separable transform (LFNST);

subblock motion vector refinement;

decoder side motion vector refinement (DMVR);

adaptive motion vector resolution;

dependent quantization; and/or deblocking filter.

3. The method of claim 1, wherein:

the selecting comprises:

determining, among the plurality of coding tools of the video codec, a second subset of the plurality of coding tools to exclude for the machine task; and the generating comprises:

generating the decoded information from the coded video bitstream without using the second subset of the plurality of coding tools.

4. The method of claim 3, wherein the second subset of the plurality of coding tools comprises at least one intra coding tool in:

intra subblock prediction (ISP);

matrix-based intra prediction (MIP); and/or decoder-side intra mode derivation (DIMD).

5. The method of claim 3, wherein the second subset of the plurality of coding tools comprises at least one inter coding tool in:

optical flow-based motion refinement;

bi-directional optical flow (BDOF);

merge with motion vector difference (MMVD);

subblock transform (SBT);

affine mode; and/or bi-prediction with CU level weights (BCW).

6. The method of claim 3, wherein the second subset of the plurality of coding tools comprises at least one transform and quantization tool in:

multiple transform set (MTS); and/or non-separable primary transform (NSPT).

7. The method of claim 3, wherein the second subset of the plurality of coding tools comprises at least one in-loop filtering tool in:

luma mapping chroma scaling (LMCS);

adaptive loop filter (ALF);

cross-component adaptive loop filter (CCALF);

sample adaptive offset (SAO); and/or bilateral filtering.

8. The method of claim 3, wherein the determining comprises:

determining that a control flag associated with a specific coding tool indicates a disabling of the specific coding tool; and determining that the specific coding tool is in the second subset of the plurality of coding tools.

9. The method of claim 8, comprising:

determining a value of the control flag from a high level syntax in the coded video bitstream, the high level syntax being of one of a sequence level parameter and/or a picture level parameter.

10. The method of claim 8, further comprising:

determining a value of the control flag to indicate the disabling of the specific coding tool when the coded video bitstream is determined for the machine task.

11. The method of claim 8, further comprising:

extracting the control flag from a sequence parameter set (SPS), the control flag being constrained to have a value indicating the disabling of the specific coding tool, wherein the control flag comprises at least one of:

sps_mts_enabled_flag associated with a transform and quantization tool of multiple transform set (MTS);

sps_alf_enabled_flag associated with an in-loop filtering tool of adaptive loop filter (ALF);

sps_lmcs_enabled_flag associated with an in-loop filtering tool of luma mapping chroma scaling (LMCS);

sps_bdof_enabled_flag associated with an inter coding tool of bi-directional optical flow (BDOF);

sps_mmvd_enabled_flag associated with an inter coding tool of merge with motion vector difference (MMVD);

sps_sbt_enabled_flag associated with an inter coding tool of subblock transform (SBT);

sps_affine_enabled_flag associated with an inter coding tool of affine mode;

sps_bcw_enabled_flag associated with an inter coding tool of bi-prediction with CU level weights (BCW); and/or sps_isp_enabled_flag associated with an intra coding tool of intra subblock prediction (ISP).

12. The method of claim 8, further comprising:

determining a referenced sequence parameter set (SPS) associated with at least one of a profile, a subprofile, a tier, and/or a level; and decoding the control flag from the referenced SPS, the control flag being constrained to have a value indicating the disabling of the specific coding tool, wherein the control flag comprises at least one of:

sps_mts_enabled_flag associated with a transform and quantization tool of multiple transform set (MTS);

sps_alf_enabled_flag associated with an in-loop filtering tool of adaptive loop filter (ALF);

sps_lmcs_enabled_flag associated with an in-loop filtering tool of luma mapping chroma scaling (LMCS);

sps_bdof_enabled_flag associated with an inter coding tool of bi-directional optical flow (BDOF);

sps_mmvd_enabled_flag associated with an inter coding tool of merge with motion vector difference (MMVD);

sps_sbt_enabled_flag associated with an inter coding tool of subblock transform (SBT);

sps_affine_enabled_flag associated with an inter coding tool of affine mode;

sps_bcw_enabled_flag associated with an inter coding tool of bi-prediction with CU level weights (BCW); and/or sps_isp_enabled_flag associated with an intra coding tool of intra subblock prediction (ISP).

13. The method of claim 8, further comprising:

decoding a syntax from the coded video bitstream;

when the syntax has a first value, decoding the control flag from the coded video bitstream; and when the syntax has a second value, inferring the control flag to have a value indicating the disabling of the specific coding tool.

14. The method of claim 3, wherein the determining comprises:

decoding a high level syntax (HLS) flag from the coded video bitstream, the HLS flag indicating whether the coded video bitstream is for the machine task or a human vision task; and when the HLS indicates that the coded video bitstream is for the machine task, determining, among the plurality of coding tools of the video codec, the second subset of the plurality of coding tools to exclude for the machine task.

15. The method of claim 3, wherein the determining comprises:

determining one or more requirements of the machine task; and determining the second subset of the plurality of coding tools to exclude for the machine task based on the one or more requirements of the machine task.

16. The method of claim 15, wherein when the machine task is object tracking, the second subset of the plurality of coding tools corresponds to a first excluding subset of the plurality of coding tools, and when the machine task is object detection, the second subset of the plurality of coding tools corresponds to a second excluding subset of the plurality of coding tools, the first excluding subset of the plurality of coding tools and the second excluding subset of the plurality of coding tools have at least one different inclusion and/or exclusion coding tool.

17. The method of claim 1, wherein:

the generating comprises:

reconstructing one or more pictures of the video based on the first subset of the plurality of coding tools; and the performing comprises:

performing the machine task based on the one or more pictures.

18. The method of claim 1, wherein the decoded information includes intermediate information before a reconstruction of one or more pictures of the video, operations of the reconstruction of the one or more pictures based on the intermediate information are omitted.

19. A method of video encoding, comprising:

selecting, among a plurality of coding tools of a video codec, a first subset of the plurality of coding tools for coding a video for a machine task, remaining coding tools of the plurality of coding tools other than the first subset being excluded from encoding of the video, the remaining coding tools comprising one or more coding tools that increase a visual quality of a reconstructed image for human perception;

encoding the video to generate coded information of the video based on the first subset of the plurality of coding tools; and generating a coded video bitstream that includes the coded information of the video for the machine task.

20. A non-transitory computer-readable storage medium storing instructions which when executed by a processor cause the processor to perform a method of encoding a bitstream, the method comprising:

selecting, among a plurality of coding tools of a video codec, a first subset of the plurality of coding tools for coding a video for a machine task, remaining coding tools of the plurality of coding tools other than the first subset being excluded from encoding of the video, the remaining coding tools comprising one or more coding tools that increase a visual quality of a reconstructed image for human perception;

encoding the video to generate coded information of the video based on the first subset of the plurality of coding tools;

generating the bitstream that includes the coded information of the video for the machine task; and transmitting the bitstream.

* * * * *